United States Patent
Kawahara et al.

(10) Patent No.: US 10,315,263 B2
(45) Date of Patent: Jun. 11, 2019

(54) WIRE ELECTRIC DISCHARGE MACHINE OPERATING WITH CONSTANT INTER-POLE DISTANCE

(71) Applicant: FANUC Corporation, Yamanashi (JP)

(72) Inventors: Akiyoshi Kawahara, Yamanashi (JP); Yasuo Nakashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 332 days.

(21) Appl. No.: 15/244,007

(22) Filed: Aug. 23, 2016

(65) Prior Publication Data
US 2017/0056992 A1    Mar. 2, 2017

(30) Foreign Application Priority Data
Aug. 25, 2015 (JP) .................................. 2015-166136

(51) Int. Cl.
B23H 7/18    (2006.01)
B23H 7/06    (2006.01)
(Continued)

(52) U.S. Cl.
CPC .............. *B23H 7/18* (2013.01); *B23H 1/024* (2013.01); *B23H 7/04* (2013.01); *B23H 7/065* (2013.01);
(Continued)

(58) Field of Classification Search
CPC .......... B23H 7/065; B23H 7/20; B32H 1/024; G05B 2219/45043
(Continued)

(56) References Cited

U.S. PATENT DOCUMENTS 4,339,650 A    7/1982 Tanaka et al.
4,837,415 A *  6/1989 Magara .................. B23H 7/065
                                            219/69.12
(Continued)

FOREIGN PATENT DOCUMENTS

EP    2269755 A2      1/2011
EP    2327498    *    6/2011
(Continued)

OTHER PUBLICATIONS

Translation JPH0482618.*
(Continued)

*Primary Examiner* — Ibrahime A Abraham
*Assistant Examiner* — Frederick F Calvetti
(74) *Attorney, Agent, or Firm* — Hauptman Ham, LLP

(57) ABSTRACT

In a wire electric discharge machine of the present invention, a control variable detection apparatus is an inter-pole voltage detection apparatus and detects an average inter-pole voltage as a control variable correlating with an inter-pole distance. The wire electric discharge machine comprises a machining feed speed calculation apparatus determining a machining feed speed on the basis of a deviation between target voltage set by a target value setting apparatus 7 and the average inter-pole voltage so as to eliminate the deviation. The wire electric discharge machine further comprises a feed speed distribution apparatus and a relative movement apparatus. The inter-pole distance can be kept constant by the relative movement of a wire electrode and a workpiece made on the basis of a command of thus determined machining feed speed.

6 Claims, 7 Drawing Sheets

(51) Int. Cl.
- *B23H 7/20* (2006.01)
- *B23H 1/02* (2006.01)
- *B23H 7/16* (2006.01)
- *B23H 7/04* (2006.01)
- *B23H 7/02* (2006.01)

(52) U.S. Cl.
CPC ............ *B23H 7/16* (2013.01); *B23H 7/20* (2013.01); *B23H 7/02* (2013.01); *G05B 2219/45043* (2013.01)

(58) Field of Classification Search
USPC ............................................ 219/69.12, 69.13
See application file for complete search history.

(56) References Cited

U.S. PATENT DOCUMENTS

| | | | |
|---|---|---|---|
| 5,545,870 A | 8/1996 | Fujii et al. | |
| 5,689,427 A | 11/1997 | Li et al. | |
| 6,730,872 B2* | 5/2004 | Goto | B23H 7/065 219/69.12 |
| 8,519,295 B2* | 8/2013 | Morita | B23H 1/024 219/69.13 |
| 9,346,113 B1* | 5/2016 | Grotenhuis | B23H 1/024 |
| 2009/0134126 A1* | 5/2009 | Katougi | B23H 1/022 219/69.13 |
| 2012/0048833 A1* | 3/2012 | Kawahara | B23H 1/022 219/69.13 |
| 2012/0217225 A1* | 8/2012 | Rudgley | B23H 1/02 219/69.16 |
| 2013/0206731 A1* | 8/2013 | Takahashi | B23H 7/20 219/69.12 |
| 2014/0027409 A1* | 1/2014 | Onodera | B23H 1/024 219/69.13 |
| 2014/0076856 A1* | 3/2014 | Furuta | B23H 7/065 219/69.11 |
| 2014/0083980 A1* | 3/2014 | Mai | B23H 7/20 219/69.13 |
| 2015/0196964 A1* | 7/2015 | Furukawa | B23H 1/022 219/69.13 |
| 2016/0045966 A1* | 2/2016 | Hasegawa | B23H 1/024 219/69.12 |

FOREIGN PATENT DOCUMENTS

| | | |
|---|---|---|
| JP | 63-312021 A | 12/1988 |
| JP | 4-57620 A | 2/1992 |
| JP | 4-82618 A | 3/1992 |
| JP | 7-246519 A | 9/1995 |
| JP | H8-118146 A | 5/1996 |
| JP | 2000-15524 A | 1/2000 |
| JP | 2012-45662 A | 3/2012 |
| JP | 2012192520 A | 10/2012 |
| JP | 2013-508180 A | 3/2013 |

OTHER PUBLICATIONS

Translation JPH0457620.*
Yi Jiang et al., "Detecting discharge status of small-hole EDM based on wavelet transform", The International Journal of Advanced Manufacturing Technology, Oct. 22, 2011, pp. 171-183, vol. 61 No. 1-4, Springer, Berlin, Germany.
Extended European Search Report in EP Application No. 16184701.7, dated Jan. 4, 2017.
Office Action in JP Application No. 2015-166136, dated Jul. 25, 2017, 7 pp.
Office Action in CN Application No. 201610728296.8, dated Jul. 4, 2018, 15pp.

* cited by examiner

[BEFORE MACHINING]

[AFTER MACHINING]

WIRE ELECTRIC DISCHARGE MACHINE OPERATING WITH CONSTANT INTER-POLE DISTANCE

RELATED APPLICATIONS

The present application claims priority to Japanese Patent Application Number 2015-166136, filed Aug. 25, 2015, the disclosure of which is hereby incorporated by reference herein in its entirety.

BACKGROUND OF THE INVENTION

1. Field of the Invention

The present invention relates to a wire electric discharge machine, and particularly to a wire electric discharge machine that operates with a constant inter-pole distance.

2. Description of the Related Art

A wire electric discharge machine is an apparatus that machines a workpiece by producing electric discharge between poles of a wire electrode and the workpiece. In the wire electric discharge machining, the machining is performed with maintaining the inter-pole distance within a very small value appropriate for developing electric discharge, and it is necessary to keep the inter-pole distance constant for a precise machining result.

To keep the inter-pole distance constant, the inter-pole distance may be detected as a control variable, and an operation variable may be adjusted by feedback control, such as proportional control, in such a way that the control variable approaches a predetermined target value. The operation variable is typically a speed at which the wire electrode and the workpiece are moved relative to each other during the machining (machining feed speed).

In the wire electric discharge machining, increasing the machining feed speed causes the inter-pole distance to decrease, whereas decreasing the machining feed speed causes the inter-pole distance to increase. Therefore, it is necessary to increase the machining feed speed when the inter-pole distance is greater than the target value, or to decrease the machining feed speed when the inter-pole distance is smaller than the target value. Thus the inter-pole distance can be approach the target value.

Since it is difficult to directly detect the inter-pole distance, i.e. the control variable, during electric discharge machining, an indirectly detected value of the inter-pole distance is typically used as the control variable. That is, a physical quantity that correlates with the inter-pole distance is detected, and the detected value is used as a substitute for the control variable.

In the wire electric discharge machining, an electric discharge delay period is present after applied the voltage the poles and then the electric discharge occurs, and the greater the inter-pole distance, the longer the period. The inter-pole voltage is maintained at a high value during the electric discharge delay period and it will be reduced to a low value referred to as an arc voltage after the electric discharge occurs. Thereafter, a series of cycles is repeated with interposing a predetermined pause duration therebetween. Therefore, the greater the inter-pole distance, the longer the electric discharge delay period, and hence the longer the period for which the inter-pole voltage is high. As an actual control variable, for example, an average electric discharge delay period or an average inter-pole voltage may also be used.

Japanese Patent Laid-Open No. 2012-192520 discloses a technology for identifying short-circuit pulses and changing the machining feed speed on the basis of an average number of successive short-circuit pulses.

A machining liquid is presented between the poles, and the density of electrically conductive machining waste suspended in the machining liquid between the poles varies as the machining advances. For example, when the density of the machining waste increases, the proportion of the electric discharge produced through the machining waste increases so that the electric discharge delay period shortens in spite of the inter-pole distance remain unchanged. Thus the inter-pole distance cannot be expressed through the electric discharge delay. When an attempt is so made that the control variable is constant in this state, the machining feed speed decreases and the inter-pole distance undesirably increases. That is, it is impossible to make the inter-pole distance to be constant, so that undesirable imprecise machining is resulted. Further, in Japanese Patent Laid-Open No. 2012-192520, the average number of continuous short-circuit pulses itself is used as the control variable, and an object thereof is the improvement of the straightness precision. The average number of continuous short-circuit pulses does not correlate with the inter-pole distance.

SUMMARY OF THE INVENTION

An object of the present invention is to solve the problem described above and provide a wire electric discharge machine capable of keeping constant the distance between poles of a workpiece and a wire electrode when the wire electric discharge machine performs electric discharge machining on the workpiece.

To solve the problem described above, in a wire electric discharge machine, at least one of the number of normal electric discharge events and that of abnormal electric discharge events in a predetermined period is counted, and the machining feed speed determined by machining feed speed control of related art is corrected in accordance with the number of counted electric discharge events.

The machining feed speed may be corrected on the basis of the correlation between the number of normal electric discharge events, the number of abnormal electric discharge events, or the proportion therebetween in a predetermined period and the density of electrically conductive machining waste suspended in a machining liquid. As a correction method, the machining feed speed is so corrected as to decrease when the number of normal electric discharge events increases, or to increase when the number of abnormal electric discharge events increases. As another correction method, the machining feed speed is so corrected as to decrease when the proportion of the number of normal electric discharge events increases, whereas increasing when the proportion of the number of abnormal electric discharge events increases.

A wire electric discharge machine according to the present invention produces electric discharge through a pole gap defined between poles of a wire electrode and a workpiece to machine the workpiece, and the wire electric discharge machine includes electric discharge state detection means for detecting at least one of normal electric discharge and abnormal electric discharge in the electric discharge, electric discharge event counting means for counting a number of at least one of the normal electric discharge events and the abnormal electric discharge events for each predetermined period that are detected by the electric discharge state detection means, control variable detection means for detecting a control variable that correlates with a distance between the poles, machining feed speed calculation means for calculating a machining feed speed based not only on a deviation between the detected control quantity and a target value with respect to the detected control quantity but also on the number of electric discharge events counted by the electric discharge event counting means, and relative movement means for moving the wire electrode and the workpiece relative to each other at the machining feed speed determined by the machining feed speed calculation means.

The control variable detected by the control variable detection means may be an average electric discharge delay period or an average inter-pole voltage.

The machining feed speed calculation means may include correction means for correcting at least one of the detected control variable, a target value defined with respect to the detected control variable, and a deviation between the detected control variable and the target value on the basis of the number of electric discharge events for each predetermined period.

The correction means may make correction in such a way that the machining feed speed decreases when the number of normal electric discharge events relative to the number of electric discharge events for each predetermined period increases or the number of abnormal electric discharge events for the period decreases, or the machining feed speed increases when the number of normal electric discharge events for each predetermined period decreases or the number of abnormal electric discharge events for the period increases.

The correction means may make correction in such a way that the machining feed speed decreases when a proportion of the number of normal electric discharge events out of the number of electric discharge events for each predetermined period increases or a proportion of the number of abnormal electric discharge events therein decreases, or the machining feed speed increases when the proportion of the number of normal electric discharge events for each predetermined period decreases or the proportion of the number of abnormal electric discharge events therein increases.

The present invention can provide a wire electric discharge machine capable of keeping the distance between poles of a workpiece and a wire electrode when the wire electric discharge machine performs electric discharge machining on the workpiece.

BRIEF DESCRIPTION OF THE DRAWINGS

The object and feature of the present invention described above and other objects and features thereof will be apparent from the description of the following example with reference to the accompanying drawings.

DETAILED DESCRIPTION OF THE PREFERRED EMBODIMENTS

An embodiment of the present invention will be described below with reference to the drawings.

Figure 1:
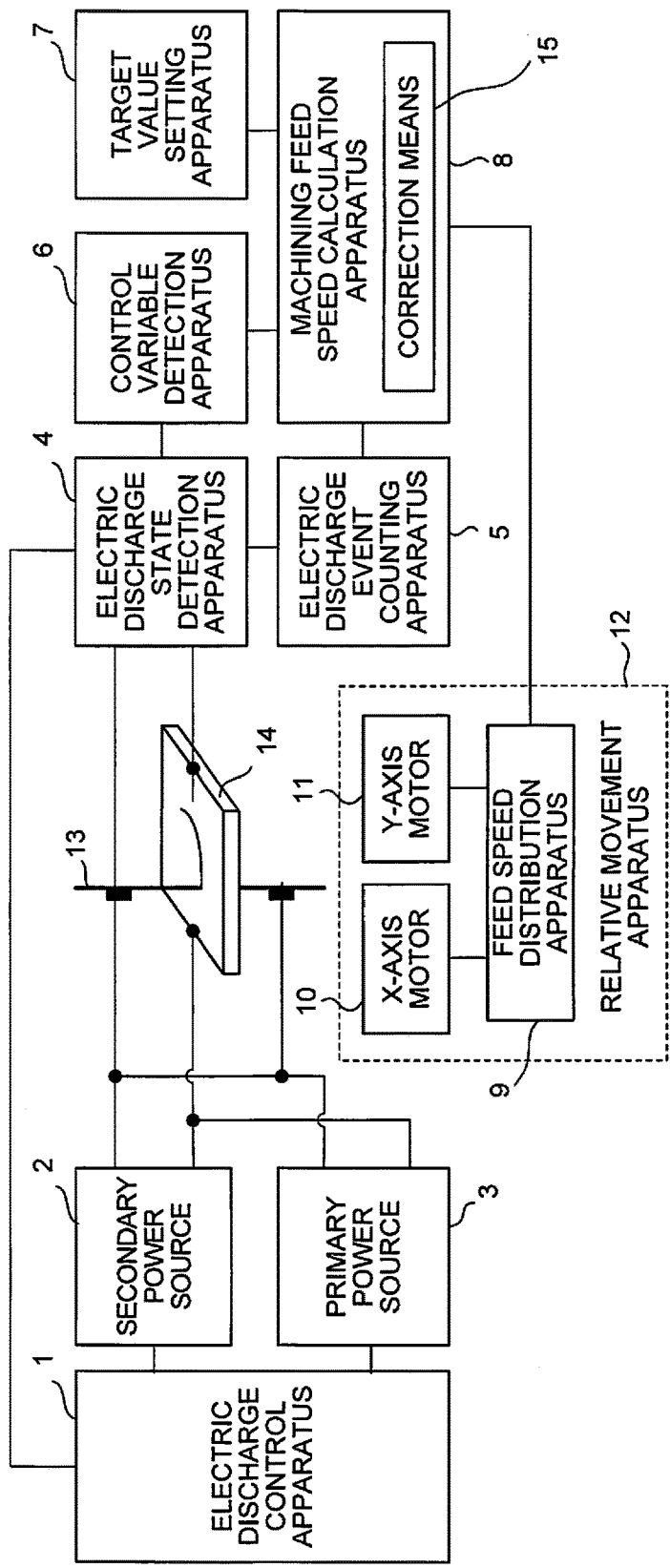
FIG. 1 is a block diagram of a wire electric discharge machine illustrating an example of the present invention.

FIG. 1 is a block diagram of a wire electric discharge machine illustrating an example of the present invention. An electric discharge control apparatus 1 commands a secondary power source 2 and a primary power source 3 to operate on the basis of a sequence determined in advance, and the secondary power source 2 and the primary power source 3 turn on a semiconductor switch on the basis of the command to supply an inter-pole space (gap formed between wire electrode 13 and workpiece 14) with electrical energy.

At the onset a secondary power source 2 of higher output impedance applies predetermined voltage across the inter-pole space to produce electric discharge, and the power source is then switched to the primary power source 3 of lower output impedance and supplies the inter-pole space with predetermined current to melt and remove part of the workpiece 14. Thereafter, a predetermined pause duration is provided to allow recovery of insulation between the poles, and the control apparatus returns to the start of the sequence again and repeats the sequence to advance the machining.

An electric discharge state detection apparatus 4 outputs a normal electric discharge signal when the voltage applied by the secondary power source 2 temporarily exceeds a predetermined threshold level and then decreases, whereas outputs an abnormal electric discharge signal when the voltage does not exceed the predetermined threshold level within a predetermined evaluation period. These signals not only serve as a trigger when the electric discharge control apparatus 1 switches the power supply from the secondary power source 2 to the primary power source 3 but also are counted by an electric discharge event counting apparatus 5 as the number of normal electric discharge events and that of abnormal electric discharge events for each predetermined period.

A control variable detection apparatus 6 is an inter-pole voltage detection apparatus and detects an average inter-pole voltage correlating with the inter-pole distance, as the control variable. A machining feed speed calculation apparatus 8 determines the machining feed speed on the basis of the deviation between target voltage set by a target value setting apparatus 7 and the average inter-pole voltage so as to eliminate the deviation.

The machining feed speed calculation apparatus 8 includes correction means 15, as will be described later. The correction means 15 makes correction in such a way that the machining feed speed decreases when the number of normal electric discharge events relative to the number of electric discharge events described above for each predetermined period increases or the number of abnormal electric discharge events for the period, or the machining feed speed increases when the number of normal electric discharge events for each predetermined period decreases or the number of abnormal electric discharge events for the period increases.

Instead, the correction means 15 makes correction in such a way that the machining feed speed decreases when the proportion of the number of normal electric discharge events relative to the number of electric discharge events described above for each predetermined period increases or the proportion of the number of abnormal electric discharge events for the period, or the machining feed speed increases when the proportion of the number of normal electric discharge events for each predetermined period decreases or the proportion of the number of abnormal electric discharge events for the period increases.

A relative movement apparatus 12 comprising a feed speed distribution apparatus 9, an X-axis motor 10, and a Y-axis motor 11, moves the wire electrode 13 and the workpiece 14 relative to each other on the basis of a machining feed speed command calculated by the machining feed speed calculation apparatus 8 to keep the inter-pole distance constant.

Figure 2:
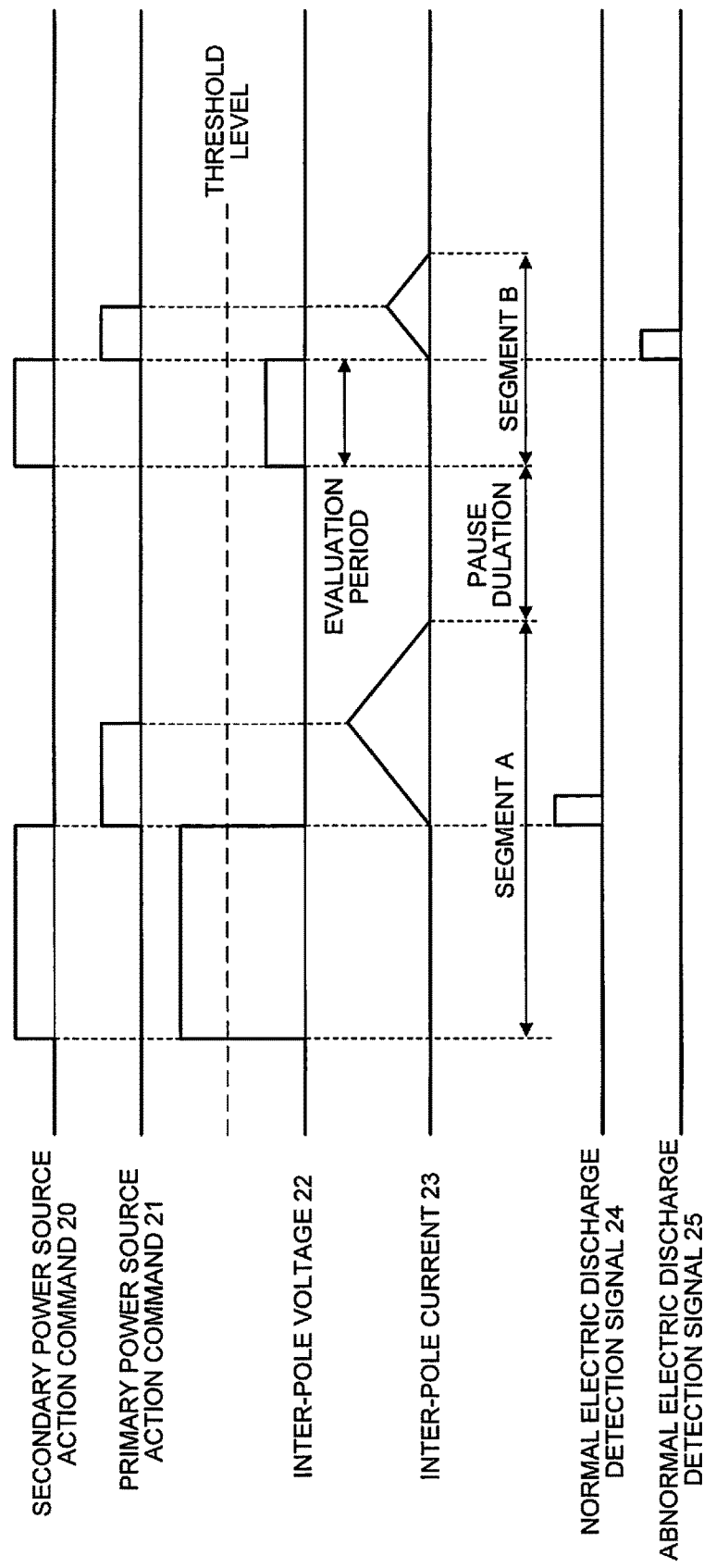
FIG. 2 is a time chart for describing a machining sequence.

FIG. 2 is a time chart for describing a machining sequence. Reference character 20 denotes a secondary power source action command. Reference character 21 denotes a primary power source action command. Reference character 22 denotes the inter-pole voltage. Reference character 23 denotes the inter-pole current. Reference character 24 denotes a normal electric discharge detection signal. Reference character 25 denotes an abnormal electric discharge detection signal.

The segment A represents a normal electric discharge period. The segment B represents an abnormal electric discharge period. The action commands that command the secondary power source 2 and the primary power source 3 to operate, the inter-pole voltage, and the inter-pole current are shown in each of the segments. In the segment A, in which excellent inter-pole insulation is achieved, the voltage applied by the secondary power source 2 temporarily exceeds the threshold level, and then electric discharge occurs, followed by a decrease in the voltage.

When the normal electric discharge, in which the inter-pole voltage 22 temporarily exceeds the threshold level and then decreases, is detected, the secondary power source 2 terminates the voltage application (secondary power source action command 20), and the primary power source 3 injects pulsed current of a predetermined magnitude (normal electric discharge pulse) (primary power source action command 21). Thereafter, upon elapsed the predetermined pause duration, the cycle is repeated and the secondary power source 2 applies the voltage again between poles. When detected the abnormal electric discharge, in which the inter-pole voltage 22 does not rise to the threshold level within the evaluation period, the primary power source 3 does not inject the pulsed current or injects pulsed current of a small magnitude (abnormal electric discharge pulse) in order to expedite recovery of inter-pole insulation. In the segment B in FIG. 2, the primary power source 3 injects the pulsed current of a small magnitude (abnormal electric discharge pulse).

Figure 3:
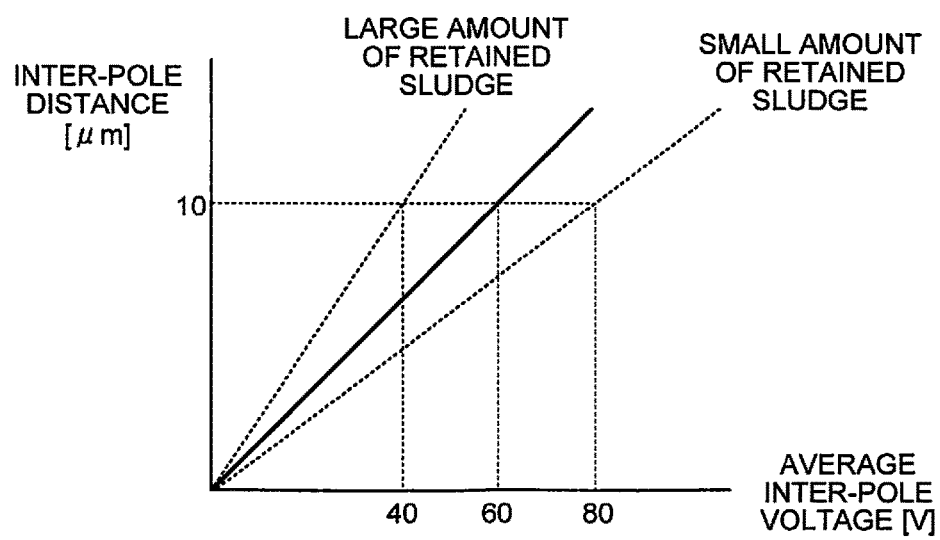
FIG. 3 shows graphs representing the relationship between average inter-pole voltage and an inter-pole distance.

FIG. 3 shows graphs representing the relationship between the average inter-pole voltage and the inter-pole distance. The higher the inter-pole average voltage, the larger the inter-pole distance. Controlling the average inter-pole voltage to be constant on the basis of the relationship shown in the graph, the inter-pole distance can be kept constant. For example, proportional control may be performed to reduce the deviation between the average inter-pole voltage and a target value. The gradient of the graph representing the relationship may depend on the machining conditions but it actually varies due, for example, to retention of electrically conductive machining waste across the poles.

For example, in a sludge retention state in which the inter-pole distance of 10 μm is obtained under the average inter-pole voltage of 60 V, the gradient of the graph increases (the number of normal electric discharge events decreases) in accordance with the amount of retained sludge, and the inter-pole voltage decreases in spite of the inter-pole distance remain unchanged (the number of normal electric discharge events increases). Conversely, when the amount of retained sludge decreases, the gradient of the graph decreases, and the inter-pole voltage increases in spite of the inter-pole distance remain unchanged. The same holds true for the relationship between the average electric discharge delay period and the inter-pole distance.

Figure 4:
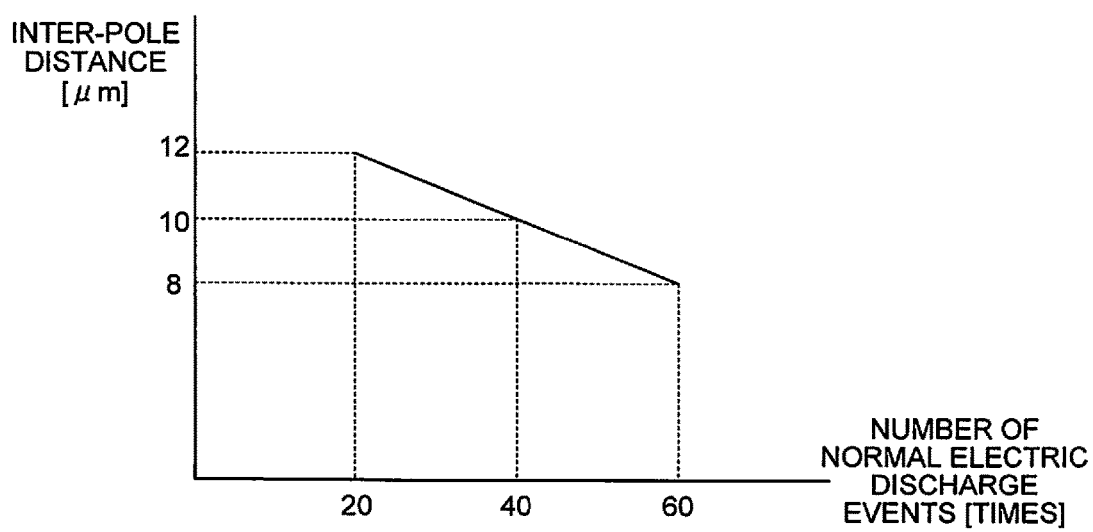
FIG. 4 shows a graph representing the relationship between the number of normal electric discharge events for each predetermined period and the inter-pole distance in a case where machining feed speed control is performed under a constant average inter-pole voltage condition.
Figure 5:
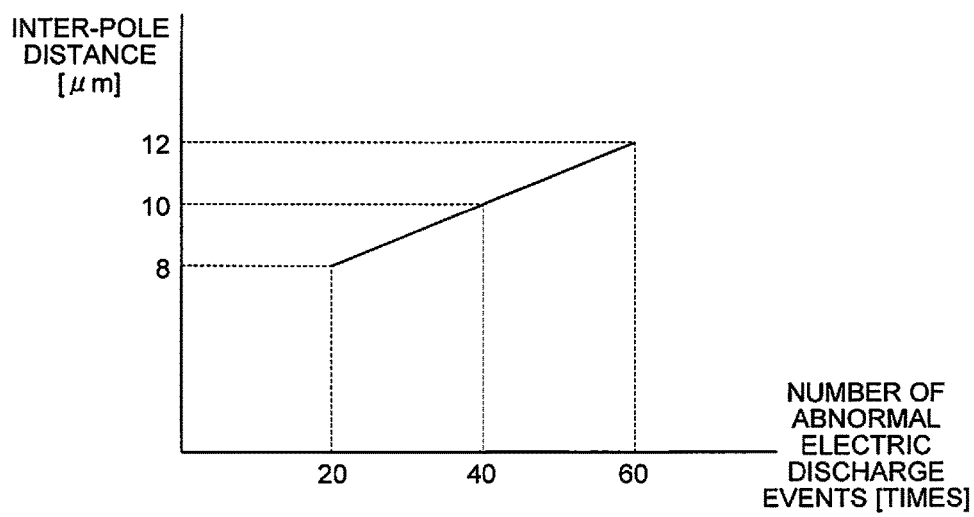
FIG. 5 shows a graph representing the relationship between the number of abnormal electric discharge events for each predetermined period and the inter-pole distance in the case where machining feed speed control is performed under a constant average inter-pole voltage condition.
Figure 6:
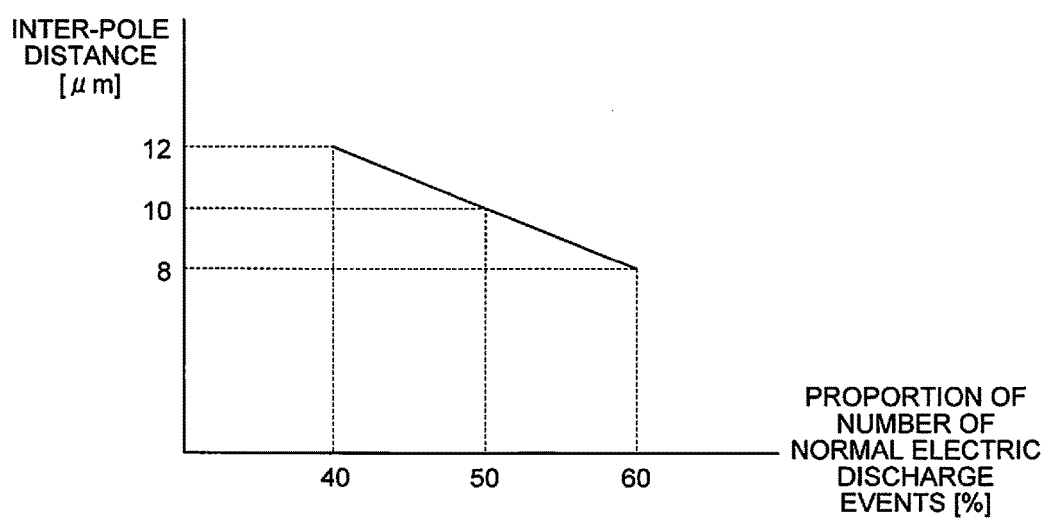
FIG. 6 shows a graph representing the relationship between the proportion of the number of normal electric discharge events for each predetermined period and the inter-pole distance in the case where machining feed speed control is performed under a constant average inter-pole voltage condition.
Figure 7:
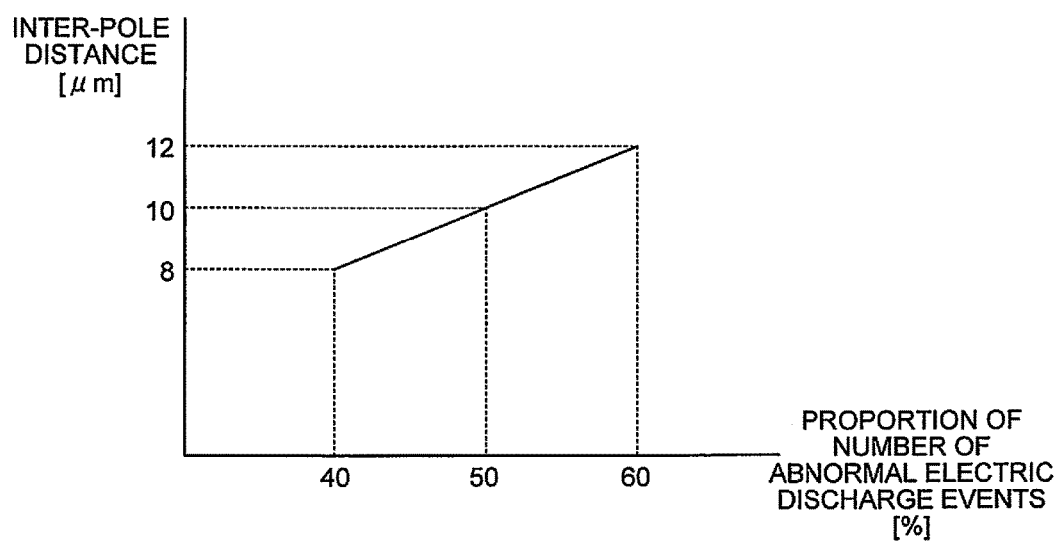
FIG. 7 shows a graph representing the relationship between the proportion of the number of abnormal electric discharge events for each predetermined period and the inter-pole distance in the case where machining feed speed control is performed under a constant average inter-pole voltage condition.

FIG. 4 shows a graph representing the relationship between the number of normal electric discharge events for each predetermined period and the inter-pole distance in a case where machining feed speed control is performed under a constant average inter-pole voltage condition. Since the average inter-pole voltage changes when the state of the retained electrically conductive machining waste between the poles changed, the inter-pole distance cannot be kept constant even when the machining feed speed control is performed to keep the average inter-pole voltage constant. Correcting the machining feed speed on the basis of the relationship described above allows the inter-electrode distance to approach a constant value. The same correction effect can be achieved, for example, even by use of the number of abnormal electric discharge events for each predetermined period (see FIG. 5), the proportion of the number of normal electric discharge events for each predetermined period (see FIG. 6), and the proportion of the number of abnormal electric discharge events for each predetermined period (see FIG. 7).

Figure 8A:
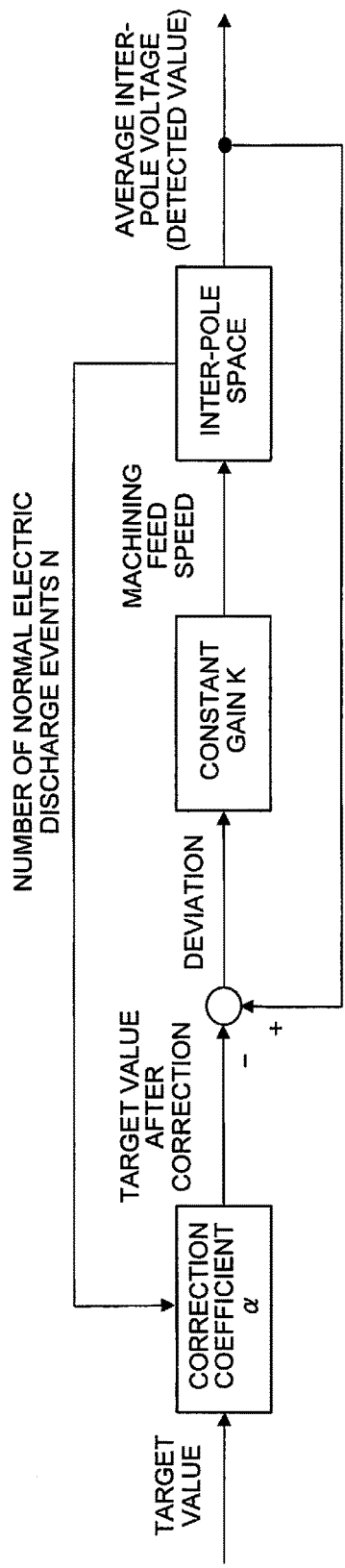
FIG. 8A is a control block diagram in a case where the average inter-pole voltage is selected as a control variable and a target value is corrected on the basis of the number of normal electric discharge events N [times/ms] for each predetermined period.

FIG. 8A is a control block diagram in a case where the average inter-pole voltage is selected as the control variable and a target value is corrected on the basis of the number of normal electric discharge events N [times/ms] for each predetermined period. It is assumed that the machining feed speed is calculated by multiplication of the deviation between a corrected target value and the average inter-pole voltage (detected value) by a constant gain K. The arrow representing the machining feed speed output from the block of the constant gain K is directed toward the inter-pole space. This shows that the inter-pole distance varies in accordance with the machining feed speed. The number of normal electric discharge events N between the poles determines a correction coefficient α. The average inter-pole voltage between the poles is detected, and the difference from the corrected target value is obtained. The product of the difference and the constant gain K is the machining feed speed. The target value is that calculated in accordance with a wire electrode/workpiece relative movement speed command stored in a command block in a machining program.

Figure 8B:
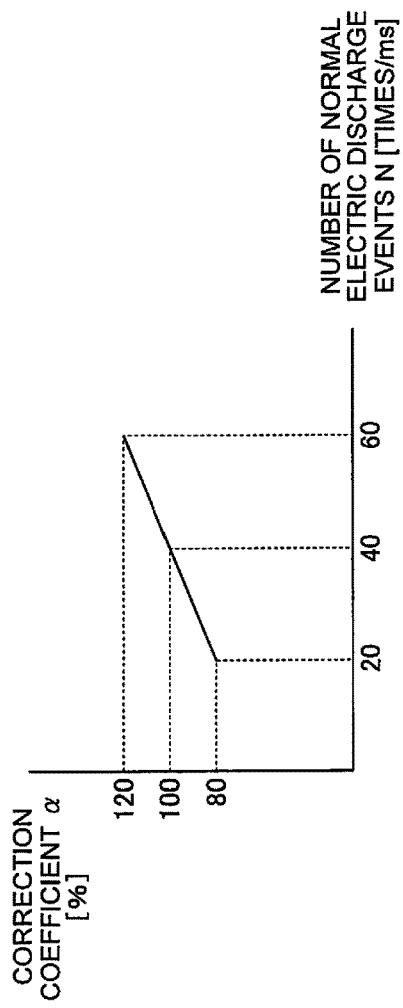
FIG. 8B shows a graph showing that a correction coefficient α [%] is changed on the basis of the number of normal electric discharge events N in correction of a target value.

As an example, it was assumed that the target value is 60 V, and the gain K is 100 mm/min/V on the basis of the following relationships obtained through the experiment, and the correction of the target value was therefore performed by multiplication of the target value by the correction coefficient α [%] shown in FIG. 8B.

TABLE 1

| Inter-pole distance | Number of normal electric discharge events | Average inter-pole voltage |
| --- | --- | --- |
| 10 μm | 20 times/ms | 48 V |
| 10 μm | 40 times/ms | 60 V |
| 10 μm | 60 times/ms | 72 V |

Figure 9:
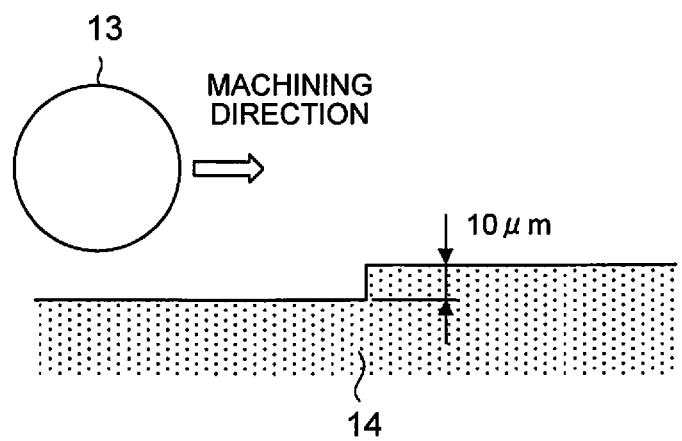
FIG. 9 shows that a control block of the present invention is used to machine a workpiece of a shape changing the inter-pole distance in stepwise manner and an error of the shape after the machining is improved.
Figure 9:
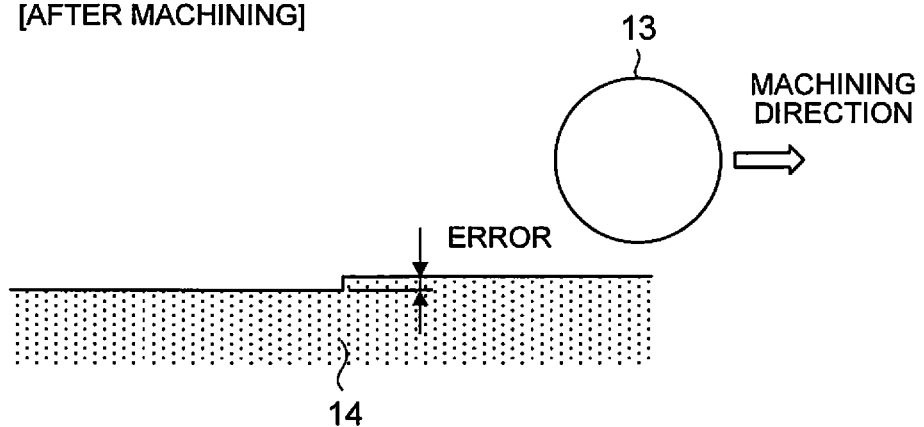

The present control block was used to machine a workpiece of a shape causing the inter-pole distance to change stepwise as shown in FIG. 9. An error of the shape after the machining is improved as follows:

TABLE 2

|  | Without correction | With correction |
| --- | --- | --- |
| Error | 3 μm | 1 μm |

Although the average inter-pole voltage is used as the control variable the average electric discharge delay period may also be used as the control variable. Further, the machining feed speed is corrected by change of a target value, and the same effect can also be achieved by changing the detected value or the deviation.

Further, the following methods may also be used as the correction method:

When the number of abnormal electric discharge events decreases, the machining feed speed is decreased, and when the number of abnormal electric discharge events increases, the machining feed speed is increased.

When the proportion of the number of normal electric discharge events increases, the machining feed speed is decreased, and when the proportion of the number of normal electric discharge events decreases, the machining feed speed is increased.

When the proportion of the number of abnormal electric discharge events decreases, the machining feed speed is decreased, and when the proportion of the number of abnormal electric discharge events increases, the machining feed speed is increased.

The embodiment of the present invention have been described above, but the present invention is not limited to the embodiment described above and can be implemented in a variety of other aspects with appropriate changes made to the embodiment.

The invention claimed is:

1. A wire electric discharge machine for producing electric discharge through a pole gap defined between poles formed of a wire electrode and a workpiece to machine the workpiece, the wire electric discharge machine comprising:
a controller programmed to
determine at least one of normal electric discharge and abnormal electric discharge in the electric discharge,
for each predetermined period, count a number of electric discharge events including at least one of (i) normal electric discharge events having the normal electric discharge, and (ii) abnormal electric discharge events having the abnormal electric discharge,
determine a control variable that correlates with a distance between the poles,
calculate a machining feed speed based on (i) a deviation between the control variable and a target value with respect to the control variable, and (ii) the counted number of electric discharge events, and
control movement of the wire electrode and the workpiece relative to each other at the determined machining feed speed,
wherein the controller is further programmed to make correction of at least one of (i) the control variable, (ii) the target value with respect to the control variable, and (iii) the deviation between the control variable and the target value, based on the number of electric discharge events counted in each predetermined period, and
wherein the controller is programmed to make the correction in such a way that
the machining feed speed decreases in response to any of
the number of normal electric discharge events for each predetermined period increases and
the number of abnormal electric discharge events for the period decreases, and
the machining feed speed increases in response to any of
the number of normal electric discharge events in each predetermined period decreases and
the number of abnormal electric discharge events for the period increases.

2. A wire electric discharge machine for producing electric discharge through a pole gap defined between poles formed of a wire electrode and a workpiece to machine the workpiece, the wire electric discharge machine comprising:
a controller programmed to
determine at least one of normal electric discharge and abnormal electric discharge in the electric discharge,
for each predetermined period, count a number of electric discharge events including at least one of (i) normal electric discharge events having the normal electric discharge, and (ii) abnormal electric discharge events having the abnormal electric discharge,
determine a control variable that correlates with a distance between the poles,
calculate a machining feed speed based on (i) a deviation between the control variable and a target value with respect to the control variable, and (ii) the counted number of electric discharge events, and
control movement of the wire electrode and the workpiece relative to each other at the determined machining feed speed,
wherein the controller is further programmed to make correction of at least one of (i) the control variable, (ii) the target value with respect to the control variable, and (iii) the deviation between the control variable and the target value, based on the number of electric discharge events counted in each predetermined period, and
wherein the controller is programmed to make the correction in such a way that
the machining feed speed decreases in response to any of a proportion of the number of normal electric discharge events out of the number of electric discharge events for each predetermined period increases and a proportion of the number of abnormal electric discharge events out of the number of electric discharge events for the period decreases, and the machining feed speed increases in response to any of the proportion of the number of normal electric discharge events for each predetermined period decreases and the proportion of the number of abnormal electric discharge events for the period increases.

3. The wire electric discharge machine according to claim 1, wherein the control variable is an average electric discharge delay period.

4. The wire electric discharge machine according to claim 1, wherein the control variable is an average inter-pole voltage.

5. The wire electric discharge machine according to claim 2, wherein the control variable is an average electric discharge delay period.

6. The wire electric discharge machine according to claim 2, wherein the control variable is an average inter-pole voltage.

* * * * *